(12) United States Patent
Wang (10) Patent No.: US 7,852,808 B2
(45) Date of Patent: Dec. 14, 2010

(54) MOBILE COMMUNICATION SYSTEM, RADIO SWITCHING METHOD, MOBILE BASE STATION AND MOBILE TERMINAL

(75) Inventor: Weizhong Wang, Tokyo (JP)

(73) Assignee: NEC Corporation, Tokyo (JP)

( * ) Notice: Subject to any disclaimer, the term of this patent is extended or adjusted under 35 U.S.C. 154(b) by 1665 days.

(21) Appl. No.: 10/461,378

(22) Filed: Jun. 16, 2003

(65) Prior Publication Data
US 2003/0235165 A1 Dec. 25, 2003

(30) Foreign Application Priority Data
Jun. 24, 2002 (JP) .............................. 2002-182668

(51) Int. Cl.
*H04W 4/00* (2009.01)
(52) U.S. Cl. ..................... 370/331; 370/315; 370/328
(58) Field of Classification Search ............... 370/278, 370/328, 315, 331; 455/444
See application file for complete search history.

(56) References Cited

U.S. PATENT DOCUMENTS

| | | | |
|---|---|---|---|
| 5,101,501 A * | 3/1992 | Gilhousen et al. | 455/442 |
| 5,345,467 A * | 9/1994 | Lomp et al. | 370/331 |
| 5,404,570 A * | 4/1995 | Charas et al. | 455/22 |
| 5,546,445 A * | 8/1996 | Dennison et al. | 455/408 |
| 5,924,033 A * | 7/1999 | Carlsson et al. | 455/436 |
| 6,243,575 B1 * | 6/2001 | Ohyama et al. | 455/456.4 |
| 6,345,186 B1 | 2/2002 | Schultz et al. | |
| 7,149,197 B2 * | 12/2006 | Garahi et al. | 370/328 |
| 2001/0005677 A1 * | 6/2001 | Dempo et al. | 455/436 |
| 2002/0077122 A1 * | 6/2002 | Yule | 455/456 |

FOREIGN PATENT DOCUMENTS

| | | |
|---|---|---|
| CN | 1335024 | 11/1999 |
| JP | 9-084126 | 3/1997 |
| JP | 10-322747 | 12/1998 |
| JP | 11-239376 | 8/1999 |
| WO | WO 97-42779 | 11/1997 |
| WO | WO 00-36858 | 6/2000 |

* cited by examiner

*Primary Examiner*—Jason E Mattis
(74) *Attorney, Agent, or Firm*—Foley & Lardner LLP (57) ABSTRACT

A mobile communication system, a radio switching method, a mobile base station and a mobile terminal in which the mobile terminal does not perform handover to a fixed base station while moving in/on a moving body to avert an adverse affect of variation of received field intensity on communication. Fixed base stations that are connected to a public telephone network are disposed along a traveling direction of a train. The train which a user who possesses a mobile terminal gets on is provided with a mobile base station capable of being connected to the fixed base stations. The mobile base station detects the mobile terminal entering into the communication area covered by the mobile base station and the train starting moving to the next station. Triggered by the two kinds of detection, the mobile base station takes over processes of handover to the fixed base station from the mobile terminal. While moving, the mobile base station performs handover to a next base station one after another. When the train approaches the next station, the mobile terminal performs handover to the fixed base station that covers the communication area around the station of arrival in behalf of the mobile base station.

20 Claims, 4 Drawing Sheets

F I G. 4

MOBILE COMMUNICATION SYSTEM, RADIO SWITCHING METHOD, MOBILE BASE STATION AND MOBILE TERMINAL

BACKGROUND OF THE INVENTION

The present invention relates to a mobile communication system, a radio switching method, a mobile base station and a mobile terminal, and in particular, to a mobile communication system, a radio switching method, a mobile base station and a mobile terminal for performing smooth handover to a fixed base station when a user uses a mobile terminal in/on a moving body such as an express train.

DESCRIPTION OF THE RELATED ART

The number of mobile phone users is increasing year by year along with the popularization of mobile phones. Additionally, it is definite in the future that mobile-phone markets will enter into a next generation of mobile phones based on CDMA (Code Division Multiple Access), in which codes are used for multiplexing. A CDMA system has some advantages of reduction of transmission power, concurrent use of the same frequency band by a plurality of mobile phones, and the like. A spread spectrum communication system is employed in the CDMA system for continuous and consistent transmission of data, not for burst transmission, thereby generating less electromagnetic disturbance. Owing to this system, it is anticipated that more users will be able to use the mobile phones on/in a moving body such as an express train. In the existing PDC (Personal Digital Cellular) communication system, however, it is difficult to execute smooth handover to a base station when the mobile phone is used in/on a moving body such as an express train traveling at a high speed. Further, it is often the case that communication by the mobile phone becomes impossible. Therefore, satisfactory service cannot be provided for users on a train or in a car.

In Japanese Patent Application Laid-Open No. HEI 10-322747, for example, there is disclosed a mobile communication system for comfortable communication on the occasion of high-speed moving. In this system, when a mobile terminal of a user receives a position control signal from a radio base station set to an entrance gate of a station as the user intends to get on a train, a control section of the mobile terminal (mobile phone) switches the operation mode from a normal operation mode to a specific space mode (high-speed moving mode) and controls a measuring section to shorten averaging time of measuring a received field intensity. By this means, the measuring section can measure the received field intensity in less time. Accordingly, it becomes possible for the user to communicate by the mobile terminal even on the train moving at a high speed.

In Japanese Patent Application Laid-Open No. HEI 9-84126, for another example, there is disclosed a mobile communication system. In this system, a high-speed moving body M is provided with a relay station RS to form a micro cell of a wireless area therein. When a mobile terminal in/on the moving body M communicates with a base station, the mobile terminal is always connected to the relay station RS in/on the moving body M. The relay station RS sequentially performs handover to an adjacent base station as the moving body M travels. Accordingly, it becomes possible to communicate by a mobile terminal even in/on a high-speed moving body M in the same manner as on the ground.

However, in the system disclosed in Japanese Patent Application Laid-Open No. HEI 10-322747, the mode of the mobile terminal in/on the moving body is switched to the specific space mode only to shorten the averaging time of measuring the received field intensity. Furthermore, the high-speed moving body is not provided with a relay station. Under the condition of high-speed moving, frequent handover is supposed to be executed. Accordingly, the mobile terminal becomes more under the influence of the variation of the received field intensity at the time of handover. Moreover, there is a need to set up dedicated equipment as described above, which results in an increase of equipment costs.

Further, in Japanese Patent Application Laid-Open No. HEI 9-84126, the mobile terminal always communicates with the base station (network) via the relay station RS on the high-speed moving body M. Even when there is no need to interpose the relay station RS for communication, communication is executed via the relay station RS. Accordingly, the relay station RS has a bigger processing burden. Further, handover processing is generated when the user gets off the train at the destination station as he/she talks through the mobile terminal and when the high-speed moving body M leaves the station at an accelerated pace. Accordingly, the mobile terminal becomes affected by the variation of the received field intensity.

SUMMARY OF THE INVENTION

It is therefore an object of the present invention to provide a mobile communication system and a radio switching method, in which a mobile terminal can communicate with a fixed base station without being affected by variation of received field intensity due to no execution of handover to a fixed base station when moving in/on a moving body.

It is another object of the present invention to provide a mobile base station for performing handover to a fixed base station in behalf of a mobile terminal that is moving in/on a moving body, thereby realizing stable communication without being affected by variation of received field intensity.

It is further another object of the present invention to provide a mobile terminal for stable communication without being affected by variation of received field intensity when moving in/on a moving body.

According to a first aspect of the present invention, for achieving the objects mentioned above, there is provided a mobile communication system comprising:

a plurality of fixed base stations that are serially disposed along a moving direction of a moving body capable of high-speed moving and that are connected to a public telephone network;

a mobile terminal that is possessed by a user who gets on the moving body; and a mobile base station that is capable of being connected to the plural fixed base stations and that is put in or on the moving body, wherein:

triggered by an entrance of the mobile terminal into a communication area of the mobile base station and by a start of the moving body, the mobile terminal performs handover from a fixed base station that has been connected to the mobile terminal to the mobile base station;

while the moving body is moving, the mobile base station sequentially performs handover to an adjacent fixed base station when the moving body enters into a communication area of the adjacent fixed base station; and when the moving body approaches a stop, the mobile terminal performs handover from the mobile base station to a fixed base station that covers a communication area around the stop.

According to the system, the mobile terminal performs handover from the fixed base station to the mobile base station put in/on the moving body when the mobile terminal enters into the communication area of the mobile base station and when the moving body starts moving. Further, while the moving body is moving, the mobile base station performs handover to a fixed base station one after another. Moreover, when the moving body approaches a next stop such as a station, the mobile base station gets the mobile terminal to perform handover to a fixed base station that covers a communication area around the stop. By this means, the mobile terminal does not have to perform handover to a fixed base station while the moving body is moving, which results in less effects of variation of received field intensity on communication by the mobile terminal.

According to a second aspect of the present invention, there is provided a radio switching method for sequentially performing handover to an adjacent fixed base station among a plurality of fixed base stations that covers respective communication areas divided into cells according to a move of a mobile terminal, comprising the steps of:

performing, by the mobile terminal in or on a moving body, handover from a fixed base station that covers a communication area where the moving body is located to a mobile base station that is put in or on the moving body, which is triggered by an entrance of the mobile terminal possessed by a user into a communication area of the mobile base station and when the moving body starts moving;

sequentially performing, by the mobile base station, handover to an adjacent fixed base station when the moving body enters into a communication area of the adjacent fixed base station while the moving body is moving; and performing, by the mobile terminal, handover from the mobile base station to a fixed base station that covers a communication area around a stop when the moving body approaches the stop.

According to the method, the mobile terminal performs handover from the fixed base station to the mobile base station when the mobile terminal enters into the communication area of the mobile base station put in/on the moving body and when the moving body starts moving. The mobile base station performs handover to a fixed base station while the moving body is moving. When the moving body approaches a stop such as a station, the mobile terminal takes over, from the mobile base station, the processes of handover to the fixed base station that covers the communication area around the stop. By this means, the mobile terminal does not have to perform handover to a fixed base station while the moving body is moving, which results in less effects of variation of received field intensity on communication by the mobile terminal.

According to a third aspect of the present invention, there is provided a mobile base station that is put in or on a moving body, comprising:

a first detecting means for detecting a mobile terminal entering into a communication area of the mobile base station;

a second detecting means for detecting the moving body which a user of the mobile terminal gets on starting moving; and a control means for:
  connecting to the mobile terminal and to a fixed base station that has been connected to the mobile terminal to continue communication between the mobile terminal and the fixed base station on the basis of the detection by the first and the second detecting means;

performing handover to an adjacent fixed base station when the moving body enters into a communication area of the adjacent fixed base station while the moving body is moving; and getting the mobile terminal to perform handover to a fixed base station that covers a communication area around a stop when the moving body approaches the stop.

According to the configuration, the mobile terminal performs handover from the fixed base station to the mobile base station put in/on the moving body when the mobile terminal enters into the communication area of the mobile base station and when the moving body starts moving. When the moving body approaches a next stop, the mobile terminal performs handover from the mobile base station to the fixed base station that covers the communication area around the stop. By this means, the mobile terminal does not have to perform handover to a fixed base station while the moving body is moving, which results in less effects of variation of received field intensity on communication by the mobile terminal.

According to a fourth aspect of the present invention, there is provided a mobile terminal capable of communicating with a fixed base station connected to a public telephone network by radio, including a communication means capable of communicating with a mobile base station put in or on a moving body when the mobile terminal is in or on or in the vicinity of the moving body, wherein:

the mobile terminal communicates with the mobile base station while the mobile terminal is moving in or on the moving body; and the mobile terminal performs handover from the mobile base station to a fixed base station that covers a communication area around a stop when the moving body approaches the stop.

According to the configuration, when the mobile terminal is moving in/on the moving body, the mobile terminal communicates with (or is connected to) the mobile base station put in/on the moving body. Further, when the moving body approaches a next stop such as a station, the mobile terminal performs handover to the fixed base station that covers the communication area around the stop to communicate with the fixed base station. By this means, the mobile terminal does not have to perform handover to a fixed base station while the moving body is moving, which results in less effects of variation of received field intensity on communication by the mobile terminal.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Referring now to the drawings, an embodiment of the present invention is explained in detail.

Figure 1:
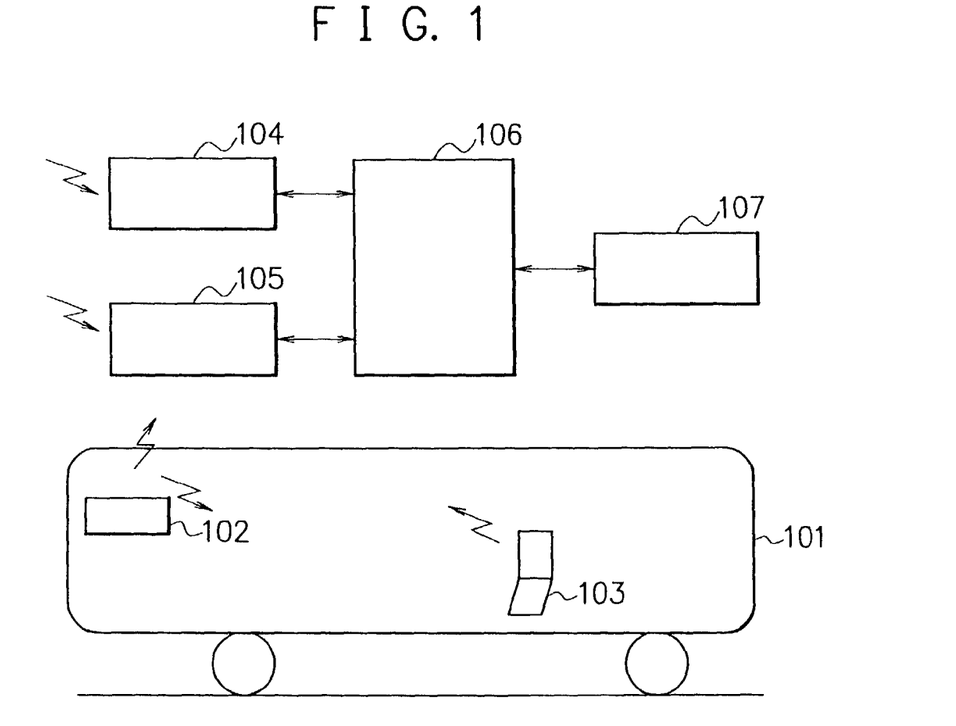
FIG. 1 is a diagram showing a configuration of a mobile communication system according to the present invention.
Figure 2:
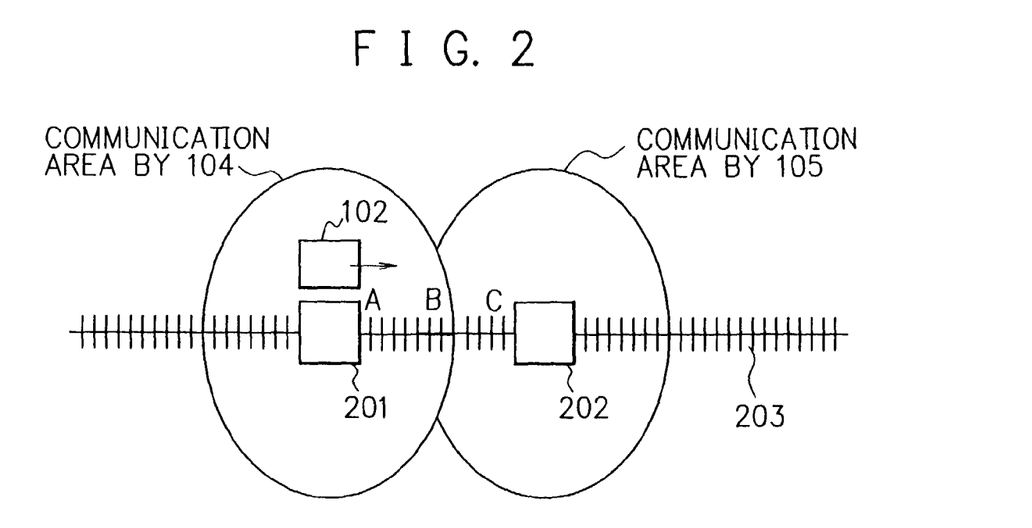
FIG. 2 is a diagram for explaining positional situation of each unit shown in FIG. 1.

FIG. 1 is a diagram showing a configuration of a mobile communication system, and FIG. 2 is a diagram for explaining positional situation of each unit shown in FIG. 1.

In FIG. 1, the mobile communication system according to the present invention comprises a train 101 such as an express train, a mobile base station 102, a mobile terminal 103, fixed base stations 104 and 105, a base station control apparatus 106, and a network (public telephone network) 107. The mobile base station 102 is put in/on the train 101. The mobile terminal 103 is used by a user inside or outside the train 101. The fixed base stations 104 and 105 communicate with the mobile base station 102 or the mobile terminal 103 by radio. The base station control apparatus 106 is connected to the fixed base stations 104 and 105. The network 107 is connected to the base station control apparatus 106. Incidentally, the mobile terminal 103 is a mobile phone. Further, the network 107 comprises a mobile telephone network, a fixed-line telephone network and the Internet.

As shown in FIG. 2, the train 101 runs on a track 203 laid via stations 201 and 202. The fixed base station 104 is placed so as to cover a communication area (cell) around the station 201. On the other hand, the fixed base station 105 is placed so as to cover a communication area (cell) around the station 202. The mobile terminal 103 in/on the train 101 is normally connected to the fixed base station 104 that covers the communication area around the station 201. When the train 101 starts running, the mobile terminal 103 is connected to the mobile base station 102. By this means, the mobile terminal 103 can communicate with the side of the fixed base station 104 without executing handover.

It is easy to locate the position of the train 101 because the train 101 travels on the fixed track 203 at a predetermined speed. Thereby, the mobile base station 102 can uniquely identify the next fixed base station to be accessed (connected) according to the positional information of the train 101. Moreover, the mobile terminal 103 has only to be connected to the mobile base station 102 to communicate with the fixed base station 104 or 105 while moving. On this occasion, the mobile terminal 103 does not have to execute handover. Subsequently, when the train 101 approaches the station 202 next to the station 201, the mobile base station 102 performs handover to the fixed base station 105 that covers the communication area around the station 202 on the basis of the positional information of the train 101 for continuous communication.

In the following, an explanation will be given of an operation of the mobile communication system according to the present invention referring to FIGS. 1 to 5.

Figure 3:
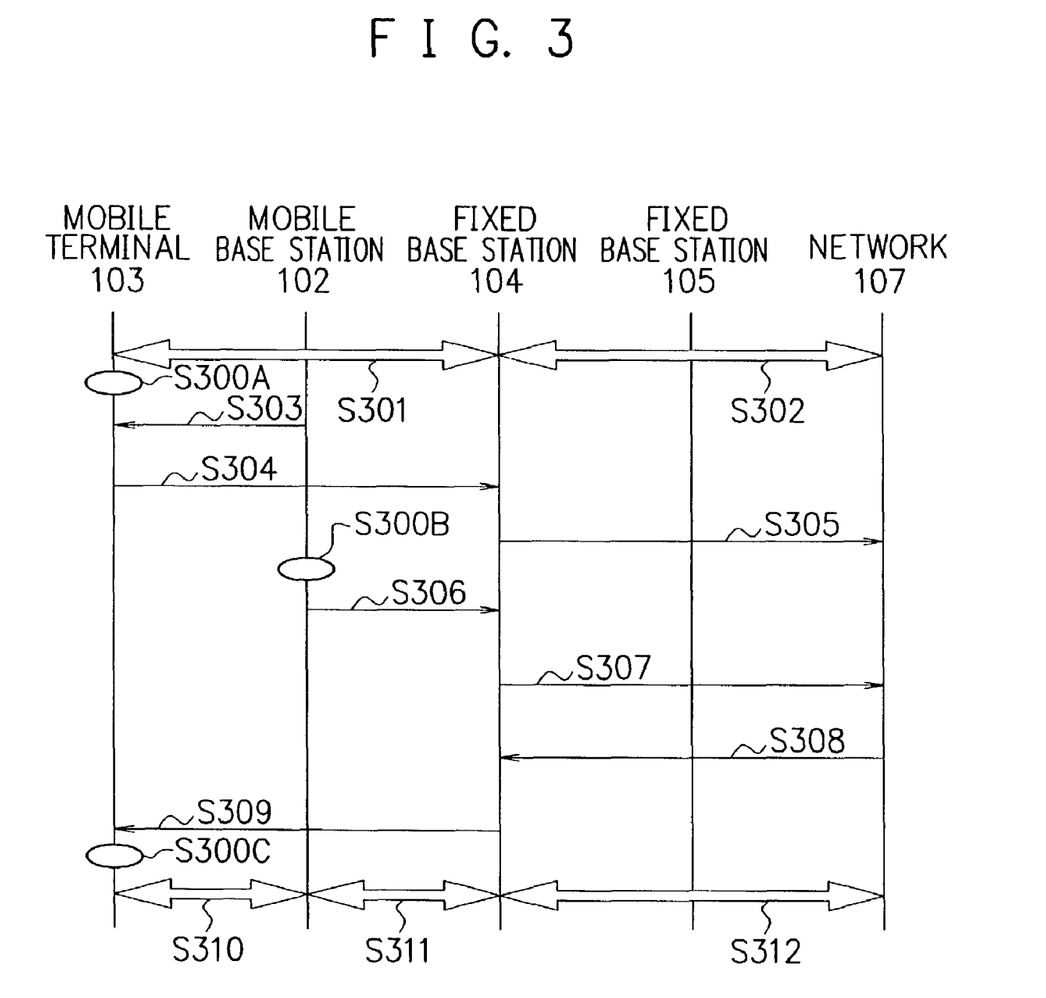
FIG. 3 is a timing chart showing processes of the mobile communication system when the train shown in FIG. 2 starts at the point A of the station 201.
Figure 4:
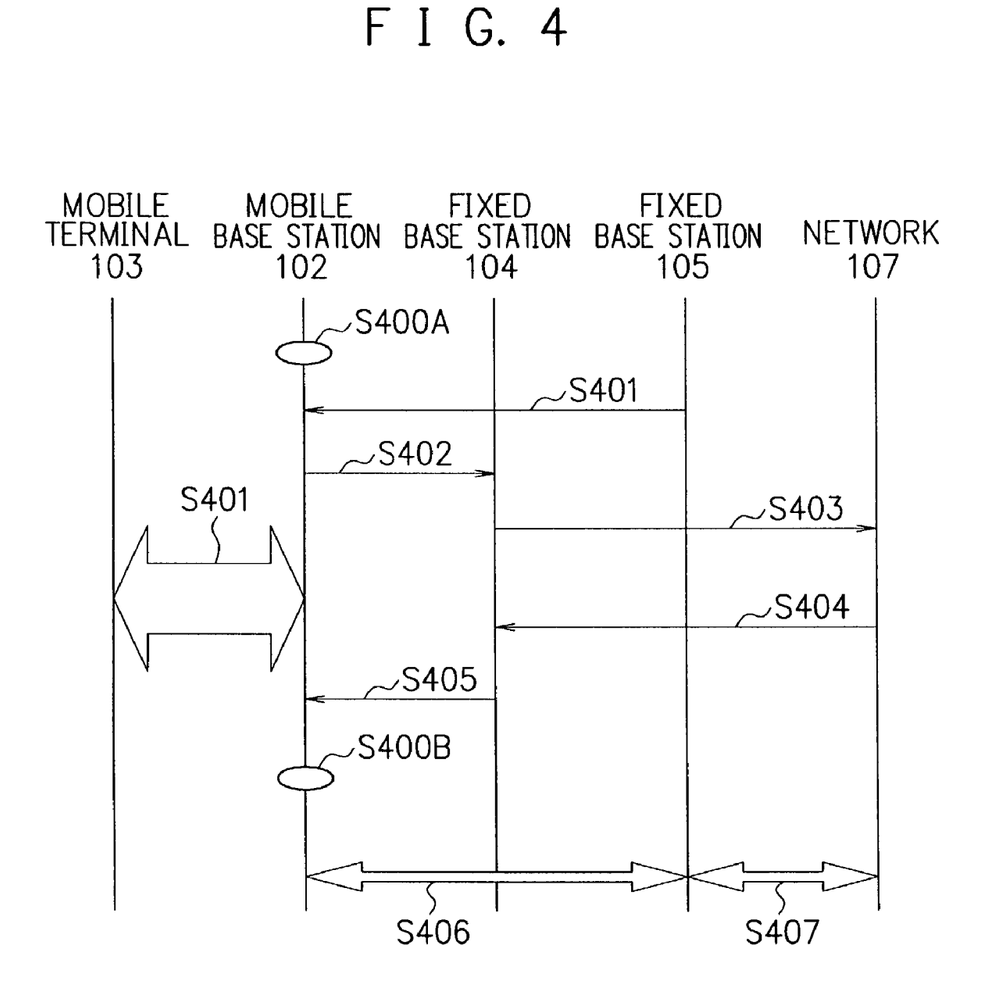
FIG. 4 is a timing chart showing processes of the mobile communication system when the train shown in FIG. 2 passes through the boundary point B between communication areas of two adjacent fixed base stations.
Figure 5:
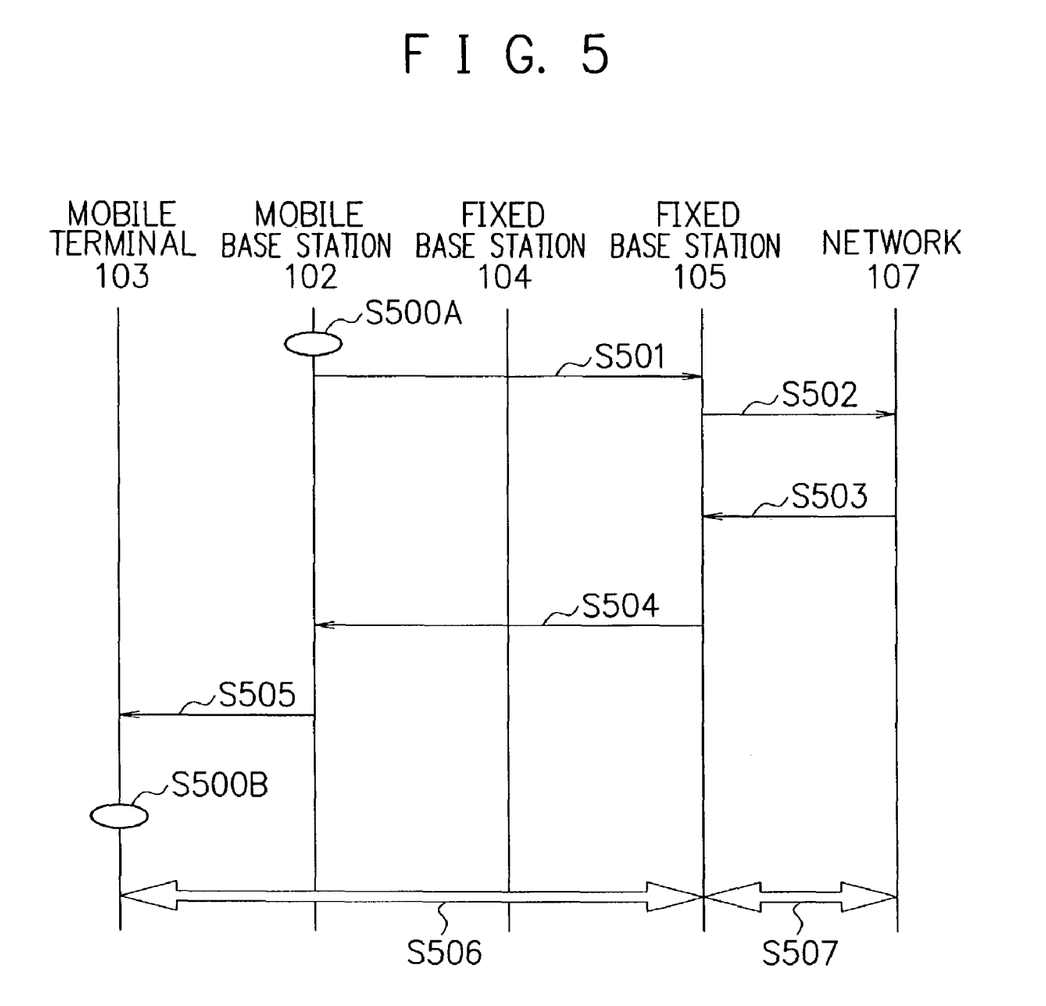
FIG. 5 is a timing chart showing processes of the mobile communication system when the train shown in FIG. 2 passes through the point C of the station 202.

FIG. 3 shows processes of the mobile communication system when the train 101 shown in FIG. 2 starts at the point A of the station 201. FIG. 4 shows processes of the mobile communication system when the train 101 passes through the boundary point B between communication areas of the fixed base stations 104 and 105. Moreover, FIG. 5 shows processes of the mobile communication system when the train 101 passes through the point C of the station 202. Incidentally, the capital "S" in FIGS. 3 to 5 denotes a step.

In FIG. 3, when a user of the mobile terminal 103 uses the mobile terminal 103 on the platform or the like in the station 201, the mobile terminal 103 is connected to the network 107 via the fixed base station 104 that covers the communication area around the station 201 (Steps S301 and S302). After that, when the user gets on the train 101 (Step S300A), the mobile terminal 103 detects the mobile base station 102 put in/on the train 101 (Step S303), and notifies the fixed base station 104 of the detected result (Step S304). When receiving the detected result, the fixed base station 104 informs the network 107 of the information acquired at Step S304 (Step S305).

When the train 101 starts running, the mobile base station 102 detects the move (Step S300B) and informs the fixed base station 104 of the information (Step S306). Further, the fixed base station 104 informs the network 107 of the information acquired at Step S306 (Step S307). Subsequently, the network 107 informs the fixed base station 104 of a direction that the mobile terminal 103 is to perform handover (Step S308). The fixed base station 104 forwards the direction to the mobile terminal 103 (Step S309).

Subsequently, the mobile terminal 103 switches the connected point from the fixed base station 104 to the mobile base station 102 (Step S300C). By this means, the mobile terminal 103 is connected to the network 107 via the mobile base station 102 and the fixed base station 104 for continuous communication (Steps S310, S311 and S312).

In the following, an explanation will be given of processes of the mobile communication system when the train 101 passes through the boundary point B between the communication areas of the fixed base stations 104 and 105 in the course of its traveling in reference to FIG. 4. When the train 101 passes through the boundary point B shown in FIG. 2, the mobile base station 102 detects the next fixed base station to be connected on the basis of the positional information of the train 101 (Step S400A). Here, the mobile base station 102 detects the fixed base station 105 that covers the communication area around the next station 202 (Step S401). The mobile base station 102 informs the fixed base station 104 of the detected information about the fixed base station 105 (Step S402). The fixed base station 104 informs the network 107 of the received detected information (Step S403). Subsequently, the network 107 informs the fixed base station 104 of a direction that the mobile base station 102 is to perform handover (Step S404). The fixed base station 104 informs the mobile base station 102 of the direction (Step S405). The mobile base station 102 activates handover function to switch the connected point from the fixed base station 104 to the fixed base station 105 (Step S400B). Subsequently, the mobile base station 102 communicates with the network 107 via the fixed base station 105 (Steps S406 and S407). Hereat, the mobile terminal 103 on the train 101 constantly communicates via the onboard mobile base station 102. Thereby, the mobile terminal 103 does not have to execute handover processes.

In the following, an explanation will be given of processes of the mobile communication system when the train 101 passes through the point C of the station 202 in reference to FIG. 5. When the train 101 is about to arrive at the station 202 (point C) shown in FIG. 2, the mobile base station 102 detects the train 101 approaching the station 202 on the basis of the positional information (Step S500A). Subsequently, the mobile base station 102 informs the connected fixed base station 105 about the detected result (Step S501). When receiving the detected result, the fixed base station 105 informs the network 107 of the information received at Step S501 (Step S502). Subsequently, the network 107 notifies the fixed base station 105 of a direction that the mobile terminal 103 is to perform handover (Step S503). When receiving the direction, the fixed base station 105 informs the mobile base station 102 of the received information (Step S504). Subsequently, the mobile base station 102 informs the mobile terminal 103 of the direction received from the fixed base station 105 (Step S505). After that, the mobile terminal 103 fulfills the handover function (Step S500B) and switches the connected point from the currently connected mobile base station 102 to the fixed base station 105 for communication with the network 107 (Steps S506 and S507).

Chart 1 shows connection relationships among the mobile terminal 103, mobile base station 102 and fixed base stations 104 and 105 described hereinbefore.

CHART 1

| Point A | Point B | Point C |
|---|---|---|
| Mobile Terminal 103 ↓ | Mobile Terminal 103 ↓ | Mobile Terminal 103 ↓ |
| Mobile Base Station 102 ↓ | Mobile Base Station 102 ↓ | ↓ |
| Fixed Base Station 104 ↓ | Fixed Base Station 105 ↓ | Fixed Base Station 105 ↓ |
| Network 107 | Network 107 | Network 107 |

By this means, while the train 101 is moving, the mobile terminal 103 is connected via the mobile base station 102 to a fixed base station that covers the communication area where the train 101 is located now. Whenever the train 101 arrives at the next station, the connected point is switched from the mobile base station 102 to a fixed base station that covers the communication area around the station of arrival. Namely, whenever the train 101 arrives at the next station, the mobile terminal 103 is directly connected to the fixed base station that covers the communication area around the station of arrival not via the mobile base station 102. Accordingly, there is no need to execute handover by the mobile terminal 103 during communication on the train. Subsequently, when the train 101 approaches a station, the connected point is switched from the mobile base station 102 to a fixed base station that covers the communication area around the station. Consequently, when a user gets off the train 101 at the station of arrival as he/she talks by the mobile terminal 103 and when the train 101 departs from the station, there is no need to execute extra handover processing. Furthermore, at this point, the mobile terminal 103 is connected to the fixed base station not via the mobile base station 102 as in normal communication circumstances. Accordingly, variation of received field intensity accompanied by handover processing has no effect on communication via the mobile terminal 103.

Incidentally, while a train (an express train) is taken as an example of a moving body in the above-described embodiment, the present invention is applicable to any object that moves along a predetermined track. Examples of the moving body include an express bus that travels along a freeway or expressway. In this case, bus stops function as the stations 201 and 202.

Moreover, the mobile terminal 103 includes, in addition to a mobile phone, a PHS (Personal Handyphone System), a PDA (Personal Digital Assistant) with wireless communication functions capable of being connected to a public telephone network, and the like.

As set forth hereinbefore, according to the mobile communication system, the radio switching method and the mobile base station of the present invention, when a mobile terminal enters in a communication area covered by a mobile base station put in/on a moving body and when the moving body starts moving, the mobile terminal performs handover from a fixed base station to the mobile terminal. By this means, communication between the mobile terminal and the fixed base station is executed via the mobile base station. Further, while the moving body is moving, the mobile base station sequentially performs handover to the next fixed base station one after another. Moreover, when the moving body approaches a stop such as a station, the mobile terminal takes over the processes of handover from the mobile base station to perform handover to a fixed base station that covers the communication area around the stop. By this means, the mobile terminal does not have to execute handover to a fixed base station while the moving body is moving. Furthermore, it becomes possible to eliminate adverse effects of variation of received field intensity on communication via the mobile terminal.

Further, according to the present invention, the mobile terminal communicates with a fixed base station via the mobile base station put in/on the moving body while the mobile terminal is moving on the moving body. Subsequently, when the moving body approaches a stop such as a station, the mobile terminal performs handover to a fixed base station that covers the communication area around the stop. By this means, communication via the mobile terminal is not affected by the variation of received field intensity.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A mobile communication system comprising:
a plurality of fixed base stations that are serially disposed along a moving direction of a moving body capable of high-speed moving and that are connected to a public telephone network;
a mobile terminal that is possessed by a user who gets on the moving body; and
a mobile base station that is capable of being connected to the plural fixed base stations and that is put in or on the moving body, wherein:
triggered by an entrance of the mobile terminal into a first communication area of the mobile base station and by a start of the moving body, the mobile terminal performs a first handover from one of the fixed base stations that has been connected to the mobile terminal to the mobile base station;
while the moving body is moving, the mobile base station initiates and sequentially performs a second handover to an adjacent one of the fixed base stations when the moving body enters into a second communication area of the adjacent one of the fixed base stations; and
when the moving body approaches a stop, the mobile terminal initiates a third handover from the mobile base station to another of the fixed base stations that covers a third communication area around the stop, so that the mobile terminal communicates directly with the another of the fixed base stations and does not communicate via the mobile base station,
wherein the mobile base station is separate and distinct from the mobile terminal.

2. A mobile communication system as claimed in claim 1, wherein:
the moving body is an express train; and
the express train moves along a predetermined track where there is set at least one stop.

3. A mobile communication system as claimed in claim 1, wherein the mobile terminal is a mobile phone, personal handyphone system, or personal digital assistant capable of being connected to the public telephone network.

4. A mobile communication system as claimed in claim 1, wherein the mobile station is capable of performing handoff for a plurality of mobile terminals located in the first communication area of the mobile station.

5. A mobile communication system as claimed in claim 2, wherein the mobile station determines that the express train has stopped when the express train is determined, based on positional information provided to the mobile station, to be located at a position corresponding to the at least one stop that is known beforehand by the mobile station.

6. A mobile communication system as claimed in claim 1, wherein, while the moving body is moving, all communications to and from the mobile terminal pass through the mobile base station and then to one or more of the fixed base stations, and wherein, when the moving body is not moving and after the third handover has occurred, all communications to and from the mobile terminal do not pass through the mobile base station but instead go directly to the one or more of the fixed base stations.

7. A radio switching method for sequentially performing handover to an adjacent fixed base station among a plurality of fixed base stations that covers respective communication areas divided into cells according to a move of a mobile terminal, comprising the steps of:

performing, by the mobile terminal in or on a moving body, a first handover from one of the fixed base stations that covers a first communication area where the moving body is located to a mobile base station that is put in or on the moving body, which is triggered by an entrance of the mobile terminal possessed by a user into a second communication area of the mobile base station and when the moving body starts moving;

initiating and sequentially performing, by the mobile base station, a second handover to an adjacent one of the fixed base stations when the moving body enters into a third communication area of the adjacent one of the fixed base stations while the moving body is moving; and initiating, by the mobile terminal, a third handover from the mobile base station to another of the fixed base stations that covers a fourth communication area around a stop when the moving body approaches the stop, so that the mobile terminal communicates directly with the another of the fixed base stations and does not communicate via the mobile base station, wherein the mobile base station is separate and distinct from the mobile terminal.

8. A radio switching method as claimed in claim 7, wherein:

the moving body is an express train; and
the express train moves along a predetermined track where there is set at least one stop, the method further comprising:

moving the mobile terminal outside of the moving body, so as to be separated from the moving body;
maintaining a telephone communication that began when the mobile terminal was in or on the moving body, between the mobile terminal and the another of the fixed base stations, without utilizing the mobile base station.

9. A radio switching method as claimed in claim 7, wherein the mobile terminal is a mobile phone, personal handyphone system, or personal digital assistant capable of being connected to a public telephone network.

10. A radio switching method as claimed in claim 8, wherein the mobile station determines that the express train has stopped when the express train is determined, based on positional information provided to the mobile station, to be located at a position corresponding to the at least one stop that is known beforehand by the mobile station.

11. A radio switching method as claimed in claim 7, wherein, while the moving body is moving, all communications to and from the mobile terminal pass through the mobile base station and then to one or more of the fixed base stations, and wherein, when the moving body is not moving and after the third handover has occurred, all communications to and from the mobile terminal do not pass through the mobile base station but instead go directly to the one or more of the fixed base stations.

12. A mobile base station that is put in or on a moving body, comprising:

a first detecting means for detecting a mobile terminal entering into a first communication area of the mobile base station;

a second detecting means for detecting the moving body which a user of the mobile terminal gets on starting moving; and a control means for:

connecting to the mobile terminal and to a first fixed base station that has been connected to the mobile terminal to continue communication between the mobile terminal and the first fixed base station on the basis of the detection by the first and the second detecting means;

performing, by the mobile terminal upon entrance of the mobile terminal into the first communication area of the mobile base station and upon a start of the moving body, a first handover from the first fixed base station that has been connected to the mobile terminal to the mobile base station;

performing a second handover, upon receiving an external signal sent from another device, to a second fixed base station when the moving body enters into a second communication area of the second fixed base station while the moving body is moving; and getting the mobile terminal to initiate a third handover to a third fixed base station that covers a third communication area around a stop when the moving body approaches the stop, so that the mobile terminal communicates directly with the another of the fixed base stations and does not communicate via the mobile base station, wherein the mobile base station is separate and distinct from the mobile terminal.

13. A mobile base station as claimed in claim 12, wherein, when the second detecting means detects the moving body starting moving, the control means informs a public telephone network of the detection by the second detecting means to direct the mobile terminal to perform handover to the mobile base station.

14. A mobile base station as claimed in claim 12, wherein the control means includes a third detecting means for detecting the moving body entering into a fourth communication area of another fixed base station disposed adjacent to a currently connected fixed base station to notify a public telephone network of the detection by the third detecting means and to perform handover to the adjacent fixed base station according to a direction from the public telephone network in response to the notification.

15. A mobile base station as claimed in claim 12, wherein the control means includes a fourth detecting means for detecting the moving body approaching a next stop so that a public telephone network informs the mobile terminal of a direction to perform handover to another fixed base station that covers a fourth communication area around the next stop on the basis of the detection by the fourth detecting means.

16. A mobile base station as claimed in claim 12, wherein the mobile base station is capable of performing handoff for a plurality of mobile terminals located in the first communication area of the mobile base station.

17. A mobile base station as claimed in claim 12, wherein, while the moving body is moving, all communications to and from the mobile terminal pass through the mobile base station and then to one or more of the fixed base stations,
   wherein, when the moving body is not moving and after the third handover has occurred, all communications to and from the mobile terminal do not pass through the mobile base station but instead go directly to the one or more of the fixed base stations, and
   wherein, when the mobile terminal has entered into the first communication area of the mobile base station but the moving body has not started moving, the mobile terminal continues communications using the one of the fixed base stations and does not communicate using the mobile base station.

18. A mobile terminal capable of communicating with a fixed base station connected to a public telephone network by radio, including a communication means capable of communicating with a mobile base station put in or on a moving body when the mobile terminal is in or on or in the vicinity of the moving body, wherein:
   the mobile terminal communicates with the mobile base station while the mobile terminal is moving in or on the moving body; and
   the mobile terminal initiates a first handover from the mobile base station to a fixed base station that covers a communication area around a stop when the moving body approaches the stop, so that the mobile terminal communicates directly with the fixed base station that covers a communication area around a stop and does not communicate via the mobile base station,
   wherein the mobile terminal performs, upon of the mobile terminal into a first communication area of the mobile base station and upon a start of the moving body, a second handover from the fixed base station that has been connected to the mobile terminal to the mobile base station,
   wherein the mobile terminal does not initiate handover from the mobile base station when the moving body is not approaching the stop and the mobile terminal moves from a cell of a first base station to a cell of a second base station,
   wherein the mobile base station is separate and distinct from the mobile terminal, and
   wherein the mobile base station is capable of assisting in handover for a plurality of mobile terminals including the mobile terminal.

19. A mobile terminal as claimed in claim 18, wherein the mobile station determines that the moving body has stopped when the moving body is determined, based on positional information provided to the mobile station, to be located at a position corresponding to the at least one stop that is known beforehand by the mobile station.

20. A mobile terminal as claimed in claim 18, wherein, while the moving body is moving, all communications to and from the mobile terminal pass through the mobile base station and then to one or more of the fixed base stations,
   wherein, when the moving body is not moving and after the handover from the mobile base station to a fixed base station that covers a communication area around a stop has occurred, all communications to and from the mobile terminal do not pass through the mobile base station but instead go directly to the one or more of the fixed base stations, and
   wherein, when the mobile terminal has entered into the first communication area of the mobile base station but the moving body has not started moving, the mobile terminal continues communications using the one of the fixed base stations and does not communicate using the mobile base station.

* * * * *